(12) United States Patent
Parish

(10) Patent No.: US 6,595,737 B1
(45) Date of Patent: Jul. 22, 2003

(54) DISCHARGEABLE HOPPER SYSTEM FOR VEHICULAR APPARATUS

(75) Inventor: Frank Parish, 558 Rolling Hills Rd., Dowell, MD (US) 20629

(73) Assignees: Frank Parish, Dowell, MD (US); Juergen Haber, Arlington, VA (US)

( * ) Notice: Subject to any disclaimer, the term of this patent is extended or adjusted under 35 U.S.C. 154(b) by 0 days.

(21) Appl. No.: 09/984,723

(22) Filed: Oct. 31, 2001

(51) Int. Cl.$^7$ ............................................. A01D 43/063
(52) U.S. Cl. ............................ 414/519; 56/202; 56/205
(58) Field of Search ........................... 414/519; 56/202, 56/203, 205, 206, 16.6

(56) References Cited

U.S. PATENT DOCUMENTS

| | | |
|---|---|---|
| 2,162,783 A | 6/1939 | Moyer |
| 2,579,103 A * | 12/1951 | Whittaker ................. 56/200 |
| 3,135,080 A | 6/1964 | Christiansen |
| 3,493,987 A | 2/1970 | Longnecker |
| 3,597,786 A | 8/1971 | Ruhl |
| 3,624,699 A | 11/1971 | Hoffmann |
| 3,713,284 A | 1/1973 | Dankel et al. |
| 3,753,340 A | 8/1973 | Mathews |
| 3,757,503 A * | 9/1973 | Soldavini ................. 56/202 |
| 3,846,964 A | 11/1974 | Frushour et al. |
| 4,015,406 A | 4/1977 | Witt et al. |
| 4,106,272 A | 8/1978 | Peterson et al. |
| 4,110,869 A | 9/1978 | Hastings |
| 4,433,532 A | 2/1984 | McCunn |
| 4,487,007 A | 12/1984 | Mullet et al. |
| 4,532,756 A | 8/1985 | Merkel |
| 4,736,575 A * | 4/1988 | Fedeli ..................... 56/202 |
| 4,796,322 A | 1/1989 | Steed et al. |
| 4,936,083 A * | 6/1990 | Deutsch ................... 56/202 |
| 4,972,666 A | 11/1990 | Peruzzo |
| 5,018,346 A | 5/1991 | Ishimaru et al. |
| 5,195,311 A | 3/1993 | Holland |
| 6,012,273 A | 1/2000 | Ogasawara et al. |
| 6,038,843 A | 3/2000 | Sebben et al. |
| 6,050,072 A | 4/2000 | Chabrier et al. |

* cited by examiner

Primary Examiner—Steven A. Bratlie
(74) Attorney, Agent, or Firm—Rosenberg, Klein & Lee

(57) ABSTRACT

A dischargeable hopper system (10) for a vehicular apparatus is provided. The dischargeable hopper system (10) comprises a fixed assembly (100) including a front support portion (110) and a pair of opposing wing portions (120) extending transversely therefrom to delineate at least a portion of a storage compartment (150). The dischargeable hopper system (10) also comprises a movable assembly (200) releasably coupled to the fixed assembly (100) in pivotally displaceable manner. The movable assembly (200) is displaceable relative to the fixed assembly (100) between open and closed positions responsive to user manipulation of an actuation assembly (300) coupled thereto. The movable assembly (200) in its closed position encloses against the fixed assembly (100) at least a portion of the storage compartment (150), and in its open position opens the portion of the storage compartment (150) for autonomous content discharge therefrom.

4 Claims, 6 Drawing Sheets

DISCHARGEABLE HOPPER SYSTEM FOR VEHICULAR APPARATUS

BACKGROUND OF THE INVENTION

FIELD OF THE INVENTION

The subject dischargeable hopper system is generally directed to an onboard storage or receptacle system for a vehicular apparatus which may be readily actuated to discharge its contents even during vehicular apparatus operation. More specifically, the dischargeable hopper system is one which may be reconfigured in situ responsive to user actuation so as to effect the autonomous discharge of its contents therefrom. That is, a storage compartment formed by the subject dischargeable hopper system may be quickly and conveniently emptied by a user without having to completely halt operation of the vehicular apparatus then remove or disassemble any components.

A storage container or receptacle is often employed with various types of vehicular equipment to provide onboard storage of certain articles, load materials, collected debris, and the like. Typical applications of such receptacles include leaf or grass catching receptacle assemblies for riding lawn mower or tractor type vehicular equipment. In such applications, the receptacle assembly typically includes a storage container in which articles or debris such as grass clippings and fallen leaves collected by the given equipment during operation is accumulated for appropriate later disposal. Periodically, as it fills to capacity, the container must be emptied before equipment operation can continue. This presents a number of obstacles in practice which significantly disrupt an operator's use of the given vehicular equipment—sometimes to the point of causing the operator to abandon use of the receptacle assembly altogether, in favor of simply expelling the solid debris collected or generated by the equipment indiscriminately upon the surrounding ground surfaces.

In the absence of automatically powered emptying means (which invariably prove to be for many prohibitively great both in complexity and cost), a user must manually empty the receptacle assembly's container, either by physically removing and upending it, or by directly removing the collected load of debris itself (often by removing a filled container lining bag). Proper safety precautions demand that the user completely halt operation of the vehicular equipment and fully deboard it prior to carrying out such emptying procedure.

The disruptive effect this causes to the user's efforts to complete the required work and the added physical exertion it requires of him or her are quite significant. This is especially so given that where a receptacle container is reduced in size to lessen the weight and volume of its load capacity (so as to minimize the physical exertion required to empty it), the frequency with which the container must be emptied is necessarily increased. Conversely, where the receptacle assembly's container is increased in capacity to reduce the frequency with which it must be emptied, the container quickly becomes much more cumbersome and difficult to empty. Yet, prompt and regular emptying of the receptacle assembly's container remains an absolute necessity, lest a clog form in the chuted path through which solid debris is expelled and directed from the vehicular equipment's working deck to the receptacle assembly not only interrupting further equipment operation, but requiring the user to take the necessarily time consuming and inconvenient remedial measures.

In view of such considerations, known grass clipping/leaf catching assemblies often employ, for example, bag-type containers dimensioned approximately 12 inches in diameter and approximately 24—30 inches in length to yield an approximate 4—6 cubic feet capacity. While container capacity is thus limited to that which may remain manageable for an adult individual of average size and build, it is such that rather frequent bag—emptying pauses are required to avoid clogging of the chuted path, particularly where the length of the grass to be mowed and/or the density of the leaves to be collected are anything other than extremely low.

There exists a need, therefore, for an onboard container or receptacle assembly for a vehicular apparatus which minimally disrupts the task being performed by a user via that vehicular apparatus, yet remains conveniently and quickly operable. There exists a need for such an assembly which affords sufficiently high load capacity to minimize the frequency and/or duration of disruptive pauses in vehicular apparatus operation, and which permits the user to discharge its contents without having to even deboard the vehicular apparatus.

PRIOR ART

Onboard storage or receptacle systems for various types of vehicular equipment are known in the art. The best prior art known to Applicant includes U.S. Pat. Nos. 6,038,843; 2,162,783; 4,433,532; 4,110,869; 3,135,080; 3,713,284; 3,493,987; 3,624,699; 3,597,786; 3,846,964; 5,195,311; 3,753,340; 4,106,272; 4,796,322; 4,972,666; 4,487,007; 6,050,072; 4,532,756; 5,018,346; 4,015,406; and, 6,012,273. Such prior art, however, nowhere discloses any system having the combination of simplicity and functionality provided by the subject dischargeable hopper system. There is no onboard storage or receptacle system for a vehicular apparatus heretofore known which provides a combination of structural features that enables a user to so quickly and conveniently collect/store and empty the contents of an onboard storage compartment, and does so as nondisruptively as does the subject dischargeable hopper system for a vehicular apparatus.

SUMMARY OF THE INVENTION

A primary object of the present invention is to provide a dischargeable hopper system for a vehicular apparatus which enables a user to quickly and conveniently actuate content discharge thereof without deboarding the vehicular apparatus.

It is another object of the present invention to provide a dischargeable hopper system having a collected debris load capacity which is not predicated upon the user's capacity to physically lift and manipulate such load.

It is yet another object of the present invention to provide a dischargeable hopper system for a vehicular apparatus which may be re-configured responsive to user actuation so as to effect autonomous content discharge therefrom.

It is still another object of the present invention to provide a dischargeable hopper system which in certain embodiments is collapsible in configuration.

These and other objects are attained in the subject dischargeable hopper system for a vehicular apparatus formed in accordance with the present invention.

The dischargeable hopper system comprises in accordance with the present invention a fixed assembly; a movable assembly releasably coupled to the fixed assembly in pivotally displaceable manner; and an actuation assembly coupled to the movable assembly for actuating the displacement thereof relative to the fixed assembly between open and closed positions. The fixed assembly includes a front support portion and pair of opposing wing portions extending transversely therefrom to delineate a portion of a storage compartment. The movable assembly in its closed position encloses against the fixed assembly at least a portion of the storage compartment, and in its open position opens that portion of the storage compartment for autonomous content discharge therefrom.

In one preferred embodiment of the dischargeable hopper system, the movable assembly pivotally engages the wing portions of the fixed assembly to substantially define a fulcrum transversely offset from the front support portion of the fixed assembly. The movable assembly thereby extends between the wing portions of the fixed assembly.

Preferably, the movable assembly is gravitationally biased to its closed position relative to the fixed assembly, and each of the fixed and movable assemblies is collapsible in configuration. The fixed assembly is preferably formed with its wing portions hingedly coupled to the front support portion, and the movable assembly is preferably formed with a frame describing a hoop configuration and a base plate coupled to extend transversely from a lower portion thereof, with a flexible barrier extending between the frame and an outer periphery of the base plate. The frame is formed with a pair of opposing side portions laterally spaced one from the other on which a pair of bearing members are respectively formed to each pivotally engage a wing portion of the fixed assembly.

DETAILED DESCRIPTION OF THE PREFERRED EMBODIMENTS

Figure 1:
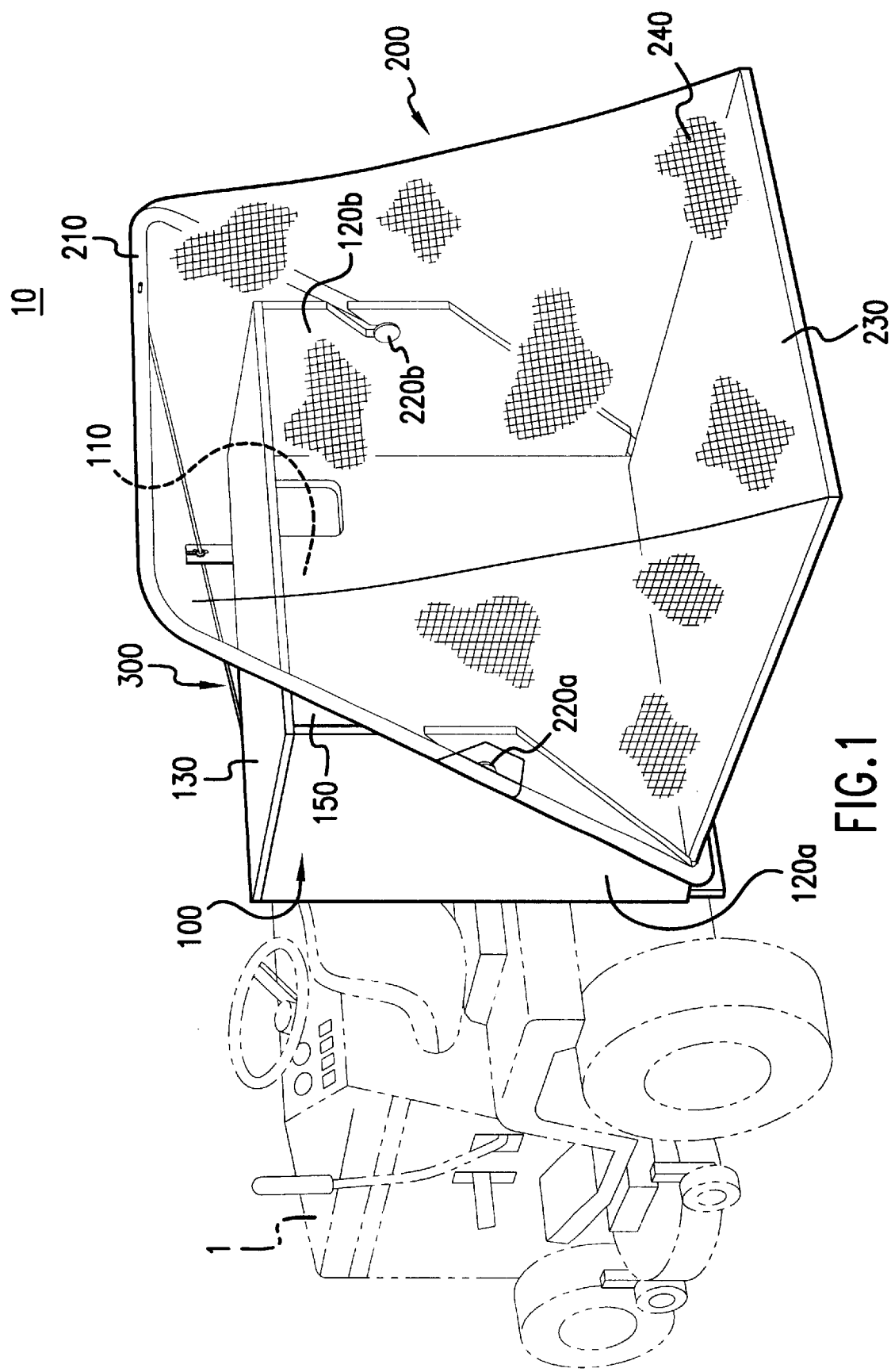
FIG. 1 is a perspective view of a preferred embodiment of the present invention shown mounted to a vehicular apparatus in an exemplary application.
Figure 2:
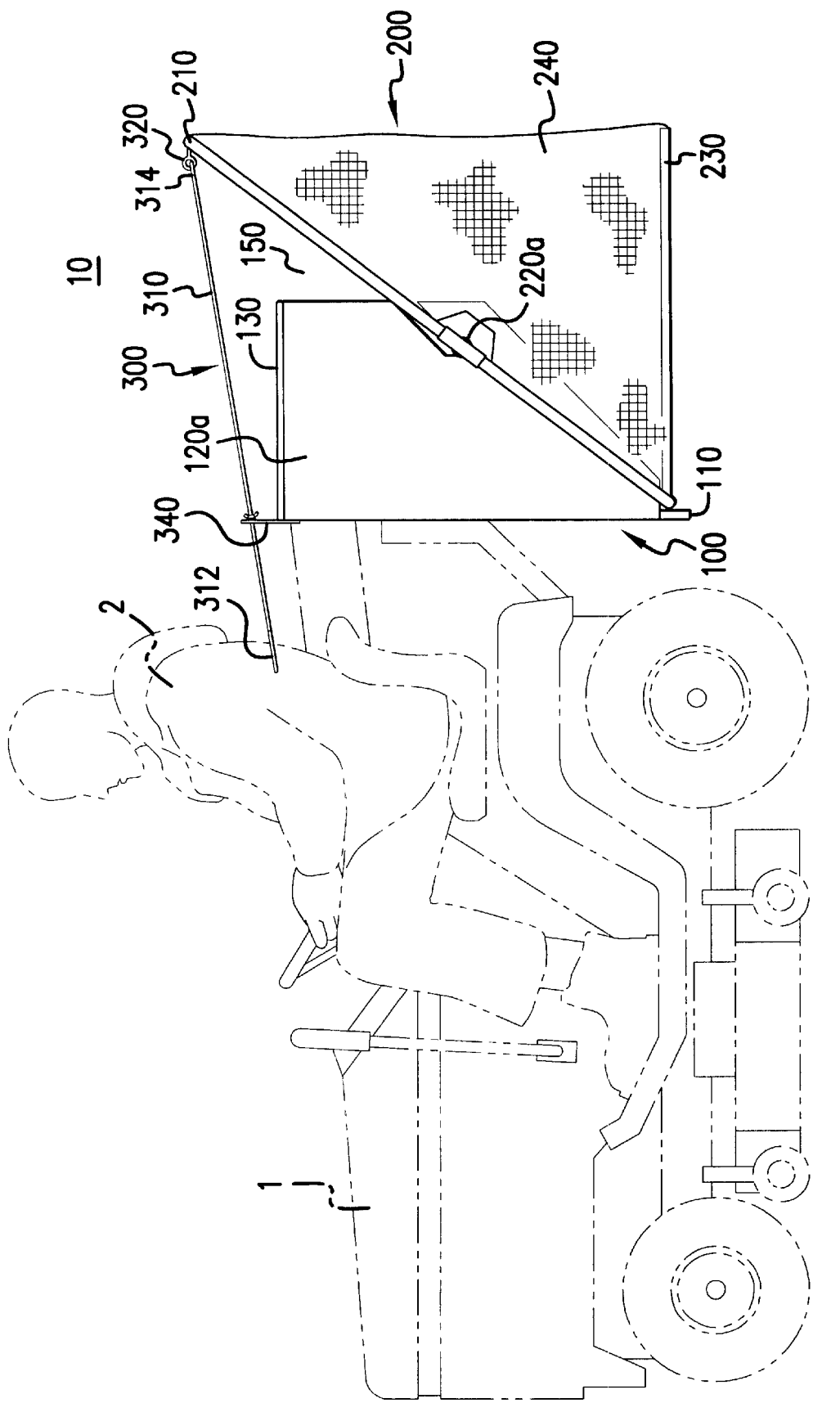
FIG. 2 is an elevational view of the preferred embodiment of FIG. 1, shown in a closed configuration.

Referring now to FIGS. 1–4, there is shown an exemplary embodiment of the subject dischargeable hopper system 10 mounted onboard an exemplary type of vehicular apparatus 1, a lawn working tractor. Dischargeable hopper system 10 generally comprises a fixed assembly 100 secured to a suitable portion of the vehicular apparatus 1, a movable assembly 200 releasably coupled in pivotally displaceable manner to fixed assembly 100, and an actuator assembly 300 coupled to movable assembly 200 for actuating its displacement between closed and open positions respectively illustrated in FIGS. 2 and 3.

In the embodiment shown, movable assembly 200 is configured to form the floor and outer wall structures in cooperatively defining with fixed assembly 100 a storage compartment 150 into which grass clippings, fallen leaves, and/or other solid debris collected or generated by the vehicular apparatus 1 may be deposited during its operation. Movable assembly 200 is coupled to fixed assembly 100 such that it is gravitationally biased to its closed position shown in FIGS. 1 and 2. To retain movable assembly 200 in this closed position (bearing against fixed assembly 100) and thereby prevent the undesired escape of storage compartment contents, actuator assembly 300 includes a mechanism for releasably locking movable assembly 200 against inadvertent displacement relative to fixed assembly 100, away from its closed position.

Figure 3:
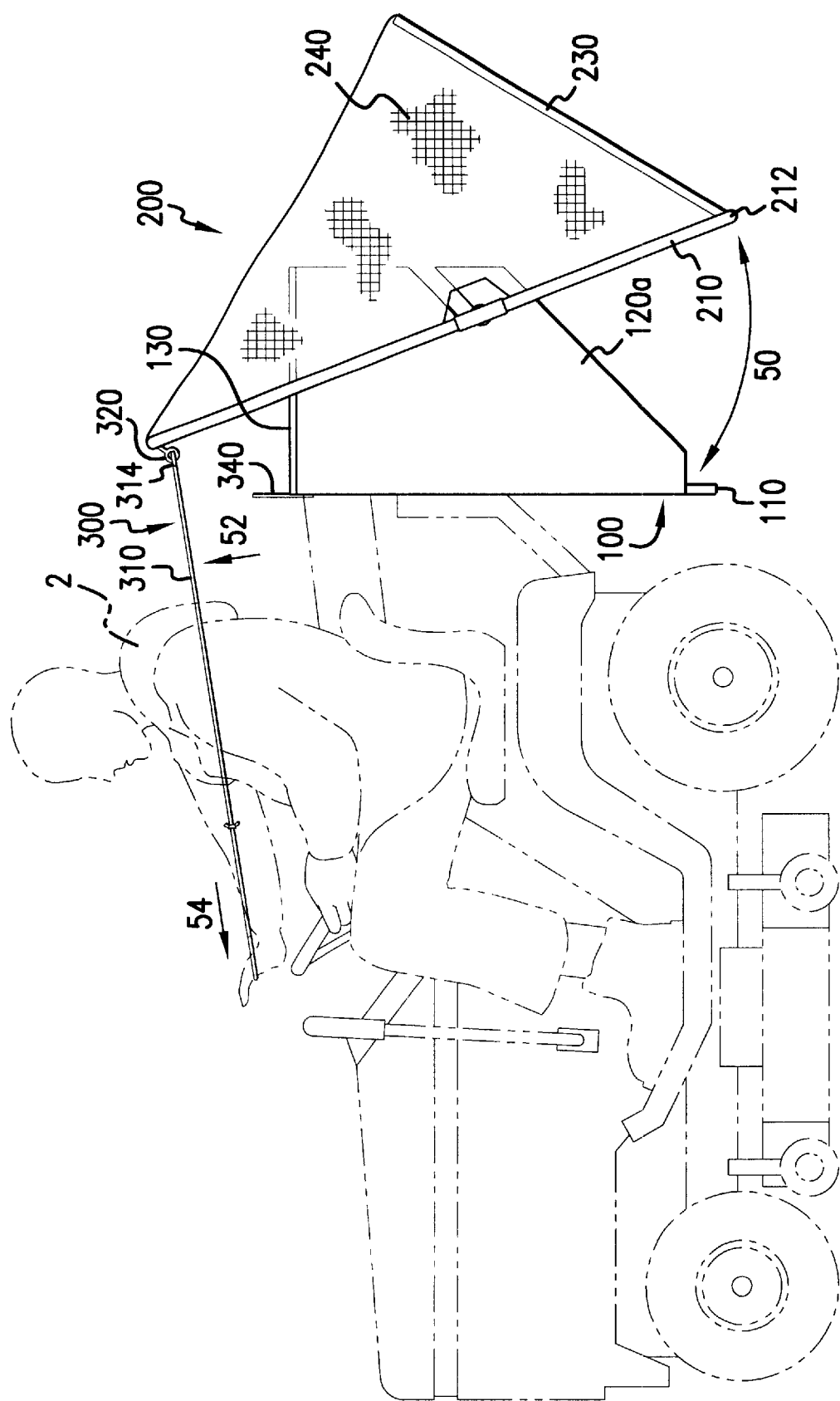
FIG. 3 is an elevational view of the preferred embodiment of FIG. 1, shown in an open configuration, as actuated by user manipulation.

When storage compartment 150 fills to or near full capacity, a user 2 may quickly and conveniently discharge the collected contents simply by driving the vehicular apparatus 1 to a suitable location, releasing the locked engagement of actuator assembly 300, then appropriately manipulating it to displace movable assembly 200 towards its open position shown in FIG. 3. As a lower end portion of movable assembly 200 draws reversibly away from fixed assembly 100, as indicated by the bidirectional arrow 50, the grass clippings, fallen leaves, and/or other solid debris that had been contained within storage compartment 150, under the force of gravity, autonomously discharge therefrom. The user 2 may then return actuator assembly 300 to reposition movable assembly 200 to its closed position for further collection of solid debris as full operation of the vehicular apparatus 1 is resumed.

Figure 4:
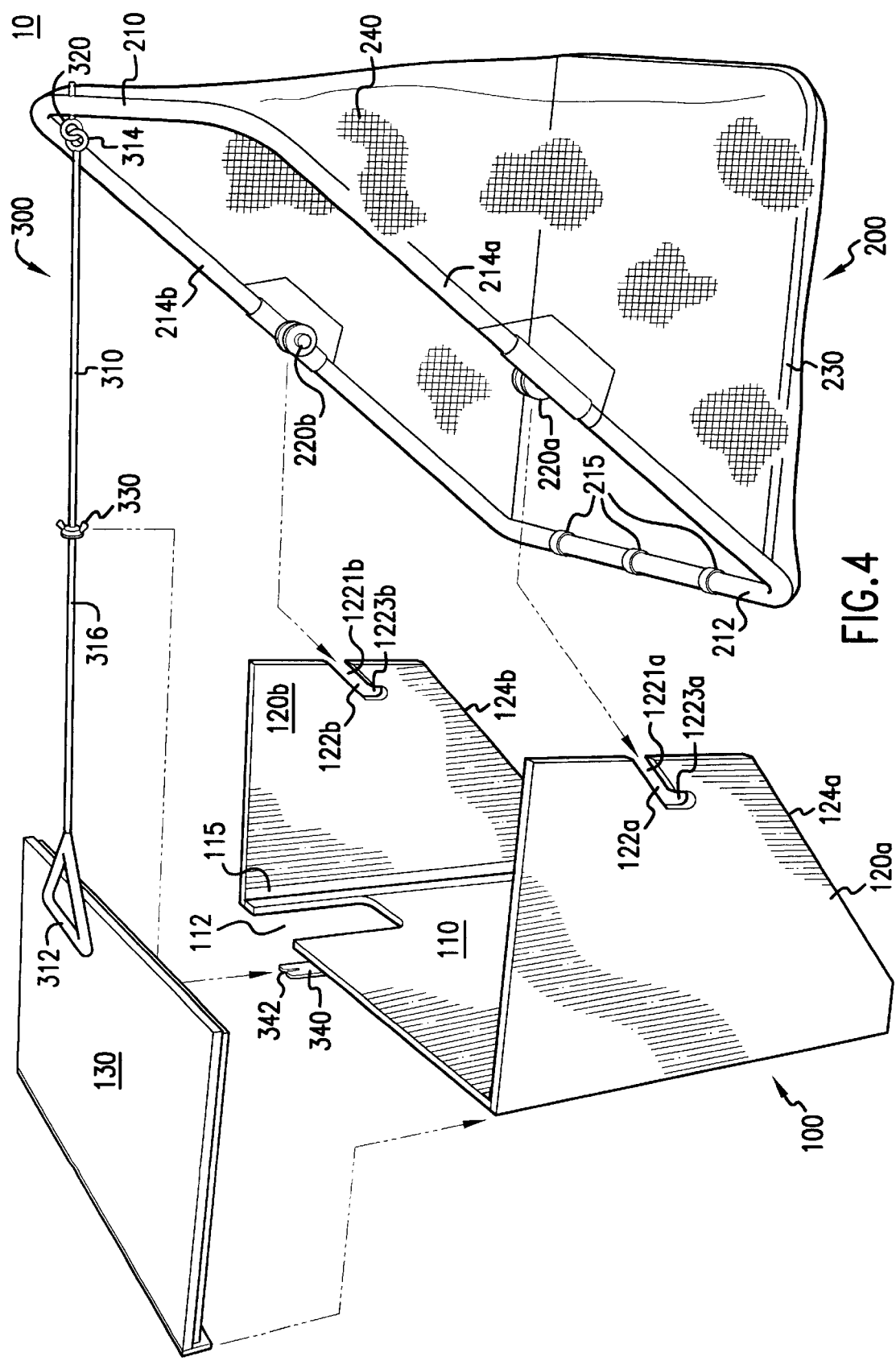
FIG. 4 is an exploded perspective view of the embodiment of FIG. 1.
Figure 6:
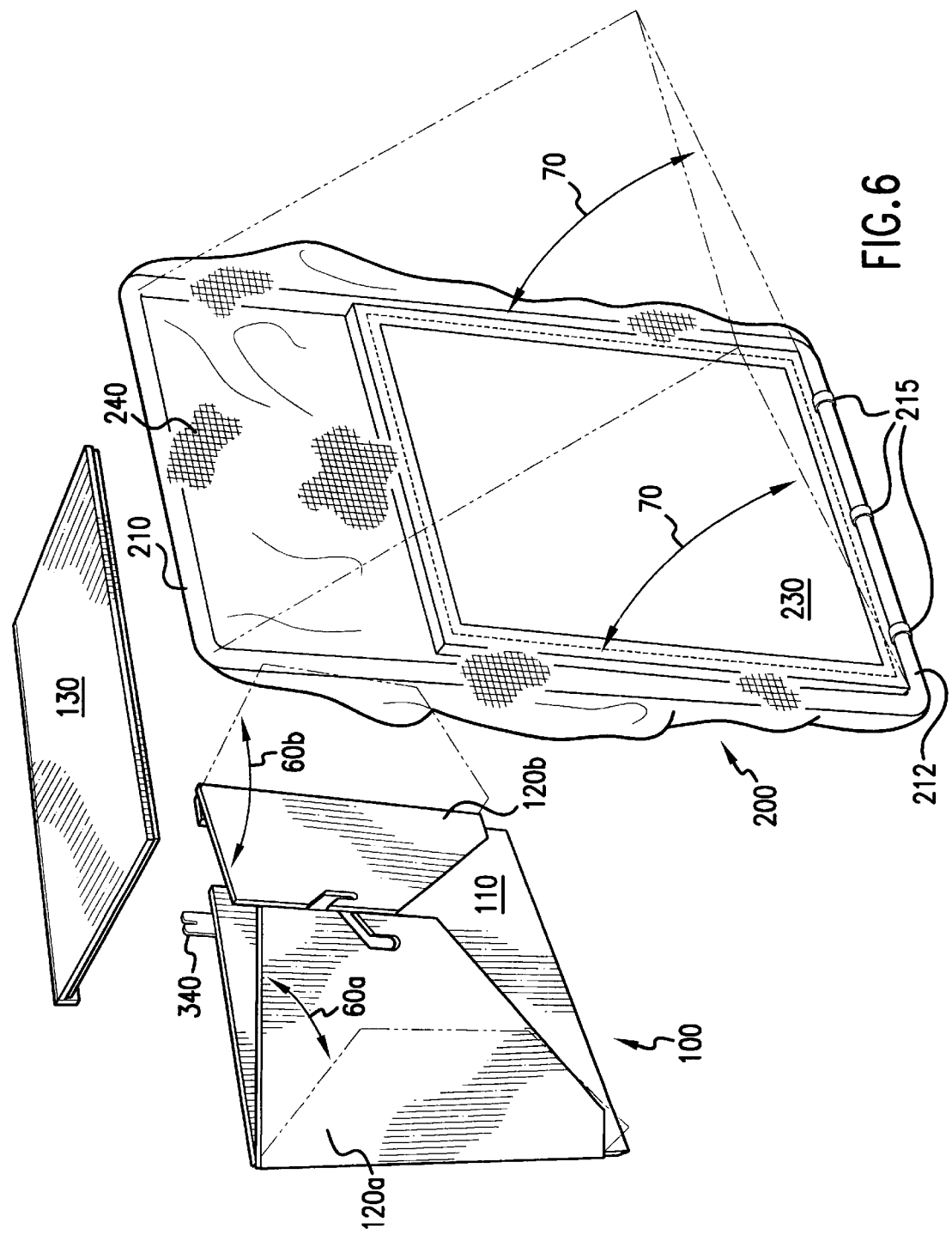

As shown more closely in FIGS. 4 and 6, fixed assembly 100 in the exemplary preferred embodiment shown includes a substantially planar front support portion 110 which is secured using any suitable hardware measures to a sufficiently rigid and stable rear portion of the vehicular apparatus 1. Fixed assembly 100 further includes a pair of substantially planar wing portions 120a, 120b which, when fully extended to their operational configuration, extend transversely from support portion 110. Front support and wing portions 110, 120a, 120b thus define the front and at least parts of the side walls delineating storage compartment 150. As such, they are preferably formed of a material such as plywood, sheet metal, composite, rubber, or other such materials having the strength, rigidity, and durability suitable for repeated and extended use in the intended application. Though each portion is shown in the disclosed embodiment having a substantially planar form, each may be configured otherwise (with shaped walls, and surfaces of arcuate, textured, grooved, perforated, or other such form, for instance) in any manner suitable for the intended application.

In the embodiment shown, each wing portion 120a is hingedly joined to a side end of flat support portion 110 by, for example, an elongate, plated, hinge fastener 115. A hinged joint permits each wing portion 120a, 120b to swing pivotally about the joint axis between its collapsed and extended positions, as indicated by the bidirectional arrows 60a, 60b.

Wing portions 120a, 120b have formed at their respective terminal edges a slotted opening 122a, 122b which extends transversely inward and downward to pivotally receive in releasable manner a frame bearing member of movable assembly 200 (described in following paragraphs). Each slotted opening 122a, 122b includes an inclined guide part 1221a, 1221b which leads to a downwardly extending cradle part 1223a, 1223b. So as to provide sufficient clearance for portions of movable assembly 200 and thereby minimize unnecessary frictional contact between the two interacting assemblies, each wing portion 120a, 120b of fixed assembly 100 is formed with a tapered lower edge segment 124a, 124b.

Dischargeable hopper system 10 in the embodiment shown finds typical application as a receptacle for grass clippings, fallen leaves, and other solid debris collected while vehicular apparatus 1 is being operated. Known attachments for facilitating such debris collection during vehicular operation include chute assemblies that guide the debris from the given cutting or collecting deck of the vehicular apparatus 1 to the receptacle. So as to securely accommodate such a chute assembly, front support portion 110 is preferably formed with an opening 112 through which an expelling end portion of the chute assembly may be passed.

Movable assembly 200 includes a frame 210, at least a portion of which describes a hoop configuration. Such hoop—configured portion of frame 210 defines an open mouth for the containment structure generally defined by movable assembly 200 which forms with fixed assembly 100 storage compartment 150. Frame 210 describes a substantially rectangular hoop configuration that corresponds to the substantially rectangular outline peripherally bounded by the fully extended configuration of fixed assembly 100. In other embodiments where fixed assembly 100 may peripherally bound outlines of various other contours, frame 210 may be otherwise configured with a corresponding contour.

Frame 210 is preferably formed of a metal or any other suitable material known in the art having the sufficient strength, rigidity, and durability required for the intended application, yet is not of such great weight that it burdens the vehicular apparatus 1 or hinders the user's ability to actuate content discharge. It is preferable in this regard that frame 210 be formed with a tubular construction which minimizes overall weight without unduly compromising structural integrity.

Frame 210 is preferably formed with a pair of bearing members 220a, 220b projecting laterally from opposed side portions thereof. Each bearing member 220a, 220b is preferably formed with an annularly grooved configuration to engage a slotted opening 122a, 122b in a pivotally displaceable—though laterally locked—manner. During assembly, bearing members 220a, 220b engage with the respective inclined guiding parts 1221a, 1221b of slotted openings 122a, 122b. Bearing members 220a, 220b are guided thereby to the respective cradle parts 1223a, 1223b into which they drop to form and maintain pivotal engagement therewith.

While in the embodiment shown, bearing members 220a, 220b are formed to extend from frame 210, it should be understood that in other embodiments, such bearing members having this or another suitable configuration may instead be formed on respective parts of wing portions 120a, 120b of fixed assembly 100. In those embodiments, corresponding parts of frame 210 would accordingly be formed with suitable accommodating structures to pivotally engage such bearing members.

So coupled to fixed assembly 100, movable assembly 200 is preferably balanced substantially in weight that while it remains gravitationally biased to its closed position (wherein a lower portion 212 of frame 210 bears against front support portion 110 of fixed assembly 100), it also remains readily displaceable to its open position by a user of average size and build, even without undue physical exertion. Bearing members 220a, 220b are thus positioned to extend laterally from a suitably selected intermediate point of the frame's side portions 214a, 214b. The precise point along each side portion 214a, 214b will depend on such parameters in a given application as the overall shape and weight of movable assembly 200, the selection of material compositions used, and the like.

Although movable assembly 200 may be formed in other embodiments with a rigid, fixed structure, it is formed with a collapsible structure in the preferred embodiment shown. Movable assembly 200 thus includes a substantially planar base plate 230 pivotally coupled along one edge to lower portion 212 of frame 210 by a plurality of coupling loops 215 (or other suitable means), such that in fully operational configuration, it extends transversely from lower frame portion 212. Movable assembly 200 also includes a flexible barrier 240 that extends as shown between frame 210 and an outer periphery of base plate 230 to yield a containment structure. Preferably, this flexible barrier 240 is formed of a netted, or perforated, material which is pervious to air and moisture, but substantially impervious to the solid debris to be collected.

The flexibility of barrier 240 and pivotal coupling of base plate 230 to frame 210 together enable the collapsibility illustrated in FIG. 6. When movable assembly 200 is to be stowed, base plate 230 may simply be pivoted about lower portion 212, as indicated by the bidirectional arrows 70 to lie substantially within the plane defined by frame 210. This yields a flat, compact structure which may be conveniently ported and stowed.

Preferably, flexible barrier 240 is formed of a nylon mesh material whose combination of strength, low density, and resistance to abrasion makes it suitable for most yard applications. It is preferably formed with perforations sufficient in size to permit the ready passage of air and moisture therethrough, whereby excessive blowing and excessive weighting of the contents that might otherwise occur within storage compartment 150 are avoided while the collected solid debris is adequately retained therein.

The nylon mesh material is preferably of sufficiently light weight that it may be fully compressed to a substantially flat form. It is also preferably of sufficient flexibility to closely conform to the bends and corners of frame 210 and base plate 230 to which it is secured.

When in its closed position, movable assembly 200 is, at its lower frame portion 212, braced against front support portion 110 while pivotally retained at its bearing members 220a, 220b within the cradle parts 1223a, 1223b of slotted openings 122a, 122b. Movable assembly 200 is thus supported with suitable stability and security though much of its bodily structure remains suspended transversely outward from fixed assembly 100. Unless an exceptionally great weight is to be loaded within storage compartment 150, the need for wheels, casters, or any other such extraneous supporting members beneath the outermost portions of movable assembly 200 is wholly obviated. This affords much flexibility during operation of vehicular apparatus 1.

One advantageous feature of the present invention is that it enables a user to effortlessly discharge the contents collected within storage compartment 150 even if its load capacity were to exceed that which the user may be capable of otherwise lifting and manipulating safely. For instance, load capacities for grass clippings and/or fallen leaves on the order of nine cubic feet or more may be readily accommodated by the exemplary embodiment shown. The subject dischargeable hopper system 10 requires no automated or powered assist for the user, even with such higher load capacities, to quickly and rather effortlessly effect content discharge of storage compartment 150.

These advantages are realized in part by the pivotal engagement of the movable assembly's bearing members 220a, 220b with the fixed assembly wing portions' slotted openings 122a, 122b in such manner as to collectively define a fulcrum about which the entirety of movable assembly 200 pivotally displaces. This fulcrum is preferably defined, as shown, transversely offset from front support portion 110 of fixed assembly 100. The movable assembly's center of gravity is correspondingly offset transversely from front support portion 110—to an extent determined by the precise intermediate location of bearing members 220a, 220b, on side portions 214a, 214b of frame 210. Movable assembly 200 is, therefore, not only biased by gravitational force to, at its lower portion 212, bear against front support portion 110, but also substantially leveraged about the defined fulcrum to permit the user to draw the entire assembly 200 to its open position without having to exert great effort.

During use, the user 2 may conveniently effect discharge of the collected contents while remaining seated at the controls of the vehicular apparatus 1. Dischargeable hopper system 10 accordingly provides for the user an actuation assembly 300 preferably having an elongate actuator arm 310 on which a handle 312 and a coupling portion 314 are formed at opposed ends thereof with an intermediate portion 316 extending longitudinally therebetween. In the embodiment shown, coupling portion 314 is configured as a ring which engages the ring formed by an eyelet fastener 320 secured to frame 210. The user may then displace movable assembly 200 pivotally to its open position simply by grasping handle portion 312 and drawing actuator arm 310 longitudinally forward.

Although movable assembly 200 is gravitationally biased in the embodiment shown to its closed position, disturbances during operation of the vehicular apparatus 1 (due to bumps, turns, and shifting of the collected load) could nonetheless cause movable assembly 200 to displace pivotally towards its open position. Even a slight displacement in this manner could sufficiently separate lower portion 212 of frame 210 from support portion 110 of fixed assembly 100 to permit substantial unintended escape of the collected storage compartment contents. Such a situation is guarded against by including within actuation assembly 300 suitable measures for releasably locking actuator arm 310 against any movement relative to fixed assembly 100 that is not directly effected by the user 2 him—/herself.

Figure 5:
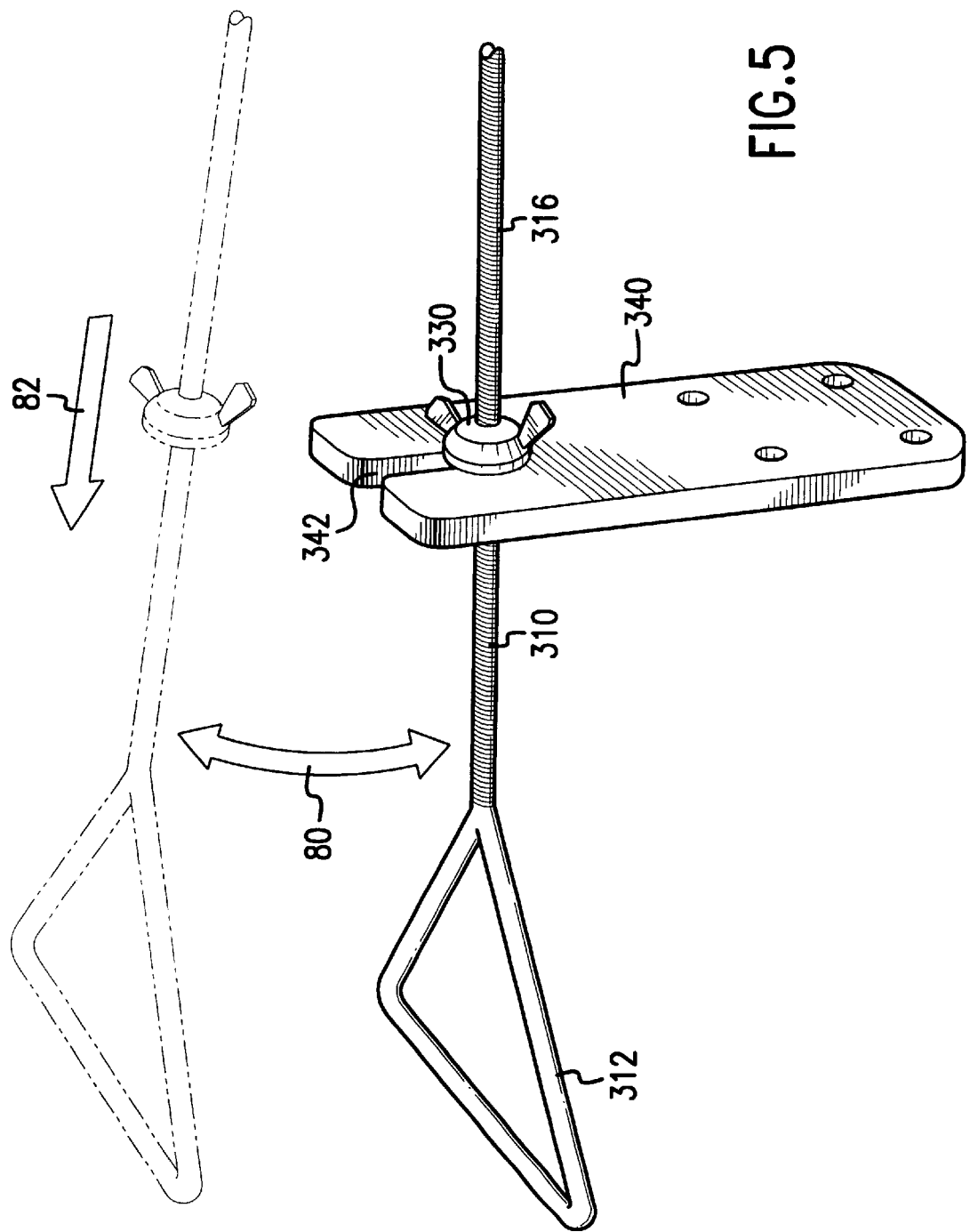
FIG. 5 is a detailed perspective view, partially cutaway, of a portion of the preferred embodiment of FIG. 1; and, FIG. 6 is an illustrative perspective view of portions of the embodiment of FIG. 1 illustrating the collapsibility of certain portions.

Actuation assembly 300 preferably includes a bracket 340 securely coupled to front support portion 110 as shown. Bracket 340 is formed with a slot 342 into which is received intermediate portion 316 of actuator arm 310. Actuator arm 310 is at least partially threaded, as shown in FIG. 5, such that a stop member 330 such as a wing nut or any other suitable member may be adjustably coupled to actuator arm 310. Being too great in radial dimension to pass through slot 342, stop member 330 stops actuator arm 310 from forward longitudinal displacement relative to bracket 340. When the contents of storage compartment 150 are to be discharged, then, the user may lift handle portion 312 to thereby displace actuator arm 310, as illustrated by the bidirectional arrow 80, and release stopping member 330 from its abutted engagement against bracket 340. The user may thereafter pull handle portion 312 to displace actuator arm 310 longitudinally forward, as indicated by the directional arrow 82, thereby drawing movable assembly 200 to its open position.

As shown in FIG. 3, base plate 230 which forms the floor of storage compartment 150 is thus pulled away from front support portion 110 and drawn to an inclined orientation. The load of debris collected in storage compartment 150 is then caused by the force of gravity to drop through the resulting open space (between lower frame portion 212 and front support portion 110), with the surfaces of base plate 230 and front support portion 110 serving effectively as guiding side walls of the resulting vertical drop chute configuration. Once content discharge is complete, the user may release movable assembly 200 to return once again to its closed position by replacing actuator arm 310 back into engagement with slot 342 of bracket 340, with stopping member 330 again retentively abutting the rear face of bracket 340.

Storage compartment 150 need not include a top cover for operation of the subject dischargeable hopper system 10 in accordance with the present invention. In many applications, however, it is preferable that at least a portion of storage compartment 150 remain covered during use by a lid member 130. Especially in applications where the ground surface is either uneven or highly sloped in terrain, a cover is necessary to not only aid in containment of the collected load of debris, but also to shield the user from debris projectiles that might cause injury.

Lid 130 may be formed of any suitably strong and durable material. It may be also configured with any suitable contour and dimensions to provide an ample degree of protective coverage over storage compartment 150 without unduly restricting its storage volume.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the disclosed features may be realized in numerous applications other than the exemplary lawn and garden application specifically shown and described herein, all without departing from the spirit or scope of the invention as defined in the appended claims.

What is claimed is:

1. A dischargeable hopper system for a vehicular apparatus comprising:
   (a) a fixed assembly including a front support portion and a pair of opposing wing portions extending transversely therefrom to delineate at least a portion of a storage compartment;
   (b) a movable assembly releasably coupled to said fixed assembly in pivotally displaceable manner, said movable assembly being displaceable relative to said fixed assembly between open and closed positions, said movable assembly in said closed position enclosing against said fixed assembly at least a portion of said storage compartment, said movable assembly in said open position opening said portion of said storage compartment for autonomous content discharge therefrom; and,
   (c) an actuation assembly coupled to said movable assembly for actuating said movable assembly displacement between said open and closed positions, said actuation assembly including:
      (i) a support bracket coupled to said front support portion of said fixed assembly; and,
      (ii) an actuating arm having a first end pivotally coupled to said movable assembly and extending longitudinally toward an operator of the vehicular apparatus, said actuating arm having a handle at a second end thereof and an intermediate section releasably engaged with said support bracket, wherein said movable assembly is displaceable to said open position subsequent to disengagement of said intermediate section by longitudinal displacement of said handle by the operator of the vehicular apparatus.

2. The dischargeable hopper system as recited in claim 1 wherein each of said fixed and movable assemblies is adapted to be collapsible.

3. A dischargeable hopper system for a vehicular apparatus comprising:

(a) a collapsible first assembly including a front support portion and a pair of opposing wing portions extending transversely therefrom to delineate a storage compartment;

(b) a collapsible second assembly coupled in pivotally displaceable manner to said first assembly for displacement between open and closed positions, a lower portion of said second assembly in said closed position bearing against said first assembly to enclose thereagainst at least a portion of said storage compartment, said lower portion of said second assembly in said open position being spaced from said first assembly to open said portion of said storage compartment for gravitational content discharge therefrom; and, (c) a longitudinally extended actuating arm having a first end pivotally coupled to said second assembly and extending toward a user, said actuating arm having a handle at a second end thereof for displacing said first assembly between said open and closed positions responsive to a user's longitudinal displacement of said handle.

4. A dischargeable hopper system for a vehicular apparatus comprising:

(a) a fixed assembly including a front support portion and a pair of opposing wing portions extending transversely therefrom to delineate a storage compartment for collecting debris generated during operation of the vehicular apparatus;

(b) a movable assembly pivotally engaging and extending between said wing portions to substantially define a fulcrum transversely offset from said front support portion of said fixed assembly, said movable assembly being displaceable relative to said fixed assembly between open and closed positions, said movable assembly being gravitationally biased about said fulcrum to said closed position, a lower portion of said movable assembly in said closed position bearing against said fixed assembly to enclose therewith at least a portion of said storage compartment, said lower portion of said movable assembly in said open position being spaced from said fixed assembly to open said portion of said storage compartment for self—discharge of the collected debris therefrom; and, (c) a longitudinally extended actuating arm having a first end pivotally coupled to said movable assembly and extending toward a user, said actuating arm having a handle at a second end thereof for displacing said movable assembly between said open and closed positions responsive to a user's longitudinal displacement of said handle.

* * * * *